April 26, 1966 R. G. GIDLOW ETAL 3,248,228
METHOD OF AGGLOMERATING A DRY POWDERY FLOUR BASE MATERIAL
Filed June 17, 1960
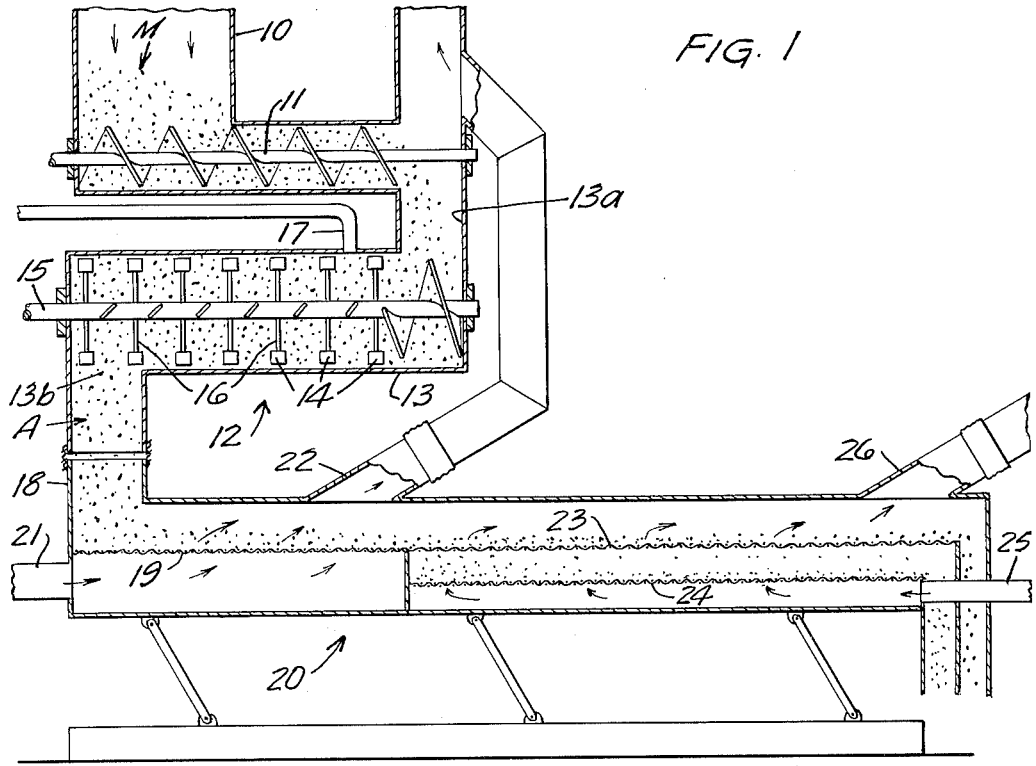
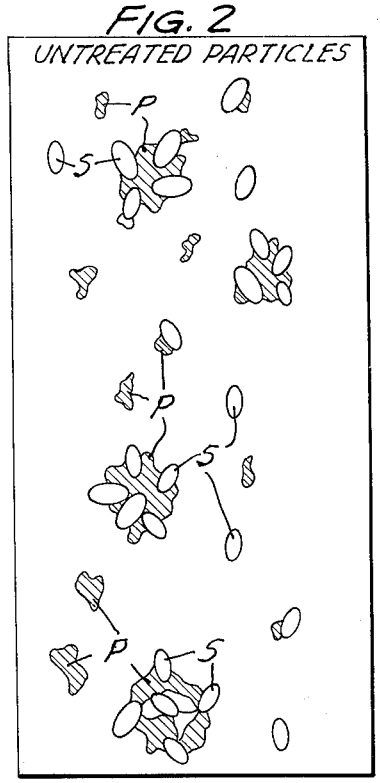
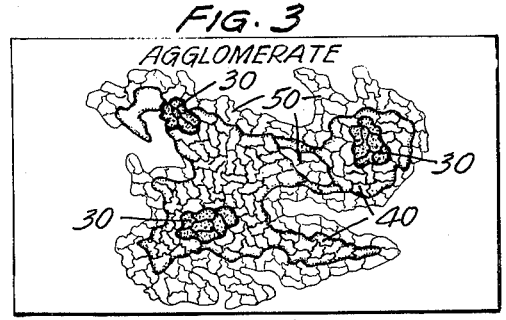
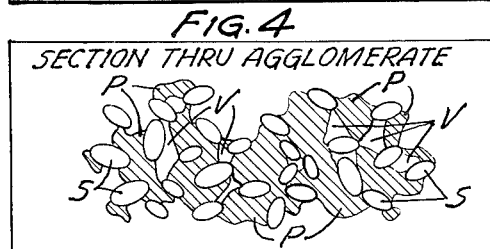
INVENTORS
ROLF G. GIDLOW
ROBERT L. TEDERS
BY Williamson & Palmatier
ATTORNEYS United States Patent Office 3,248,228
Patented Apr. 26, 1966

3,248,228
METHOD OF AGGLOMERATING A DRY POWDERY FLOUR BASE MATERIAL
Rolf G. Gidlow, North St. Paul, and Robert L. Teders, Minneapolis, Minn., assignors to The Pillsbury Company, Minneapolis, Minn., a corporation of Delaware
Filed June 17, 1960, Ser. No. 36,946
1 Claim. (Cl. 99—93)

This application is a continuation-in-part of application Serial No. 646,215, filed March 15, 1957, and now abandoned.

This invention relates to agglomeration, and in particular to the self-agglomeration of cereal flour and related products (such as wheat flour and the like) into randomly clustered groups of particles to form free flowing penetrable agglomerates which are more readily wettable than the same flour in unagglomerated form.

Flour, in its usual form, is naturally difficult to handle and package, is dusty, dry, powdery, is not free flowing, does not pour easily, tends to cake or ball in large masses, which a liquid has difficulty in penetrating to effect thorough wetting of all the particles, and is for the most part exceedingly difficult to uniformly disperse or homogeneously mix into liquid solutions such as batters, gravies and the like. Also, flour must usually be sifted when being measured to permit uniform measuring thereof because of varying density and packing. Virtually every cook and flour user is well aware of the difficulty with which flour is formed into a batter or dough due to the tendency of the fine powdery flour particles to collect in lumps or masses in the liquid used to form the batter, with the lumps or masses of flour being virtually impenetrable by the liquid, thereby materially delaying the wetting of the flour comprising the interiors of these lumps or masses until such time as the lumps are broken up and disintegrated by vigorous mechanical agitation such as provided by stirring or beating. The flour industry has long sought to remedy the aforementioned deficiencies and improve the physical characteristics of flour and flour mixes, but prior to our invention the problem remained unsolved, and the flour industry and the users of their products continued to be plagued with the inherently undesirable physical characteristics of flour noted hereinbefore.

We have found that the aforementioned undesirable characteristics of flour in its usual fine powdery form can be corrected and improved by agglomerating the flour in a novel manner to form a new, improved and very effective type of agglomerated flour structure.

This application constitutes one of several continuations-in-part of a co-pending application entitled "Quickly Dispersible Food Mix for Batter Products," Serial Number 646,215, filed March 15th, 1957, now abandoned. Although the teachings of this application are generally applicable to all types of food products and mixes incorporating flour as an essential ingredient, the course of action taught herein has particular applicability to flour products which do not have a soluble functional binding material incorporated therewith to act as the means for binding the flour particles together in agglomerates, or, to say it another way, relates primarily to those flour products in which flour substance or flour itself must function as the means for adhering the particles together or in which the flour particles are directly adhered to one another instead of being coupled together by an intermediate foreign binding material, such as sugar, for example, interposed between and holding together the insoluble flour particles. This invention has particular applicability to, and is particularly directed towards, this type of aforementioned basic material to be agglomerated, since other types of flour base mixtures or products (of which cake and pancake premixes are typical examples) containing functional foreign binders may be more successfully and efficiently agglomerated by other novel methods of treating flour products into other unusual agglomerates having different physical characteristics than those of the instant application, as set forth in still other currently co-pending applications Serial No. 36,942, filed June 17, 1960 and Serial No. 36,823, also filed June 17, 1960 now abandoned, also constituting continuations-in-part of presently pending application, Serial Number 646,215.

Thus, this application relates particularly to the agglomeration of plain flour such as is made from wheat and the like, and mixtures of flour and one or more other ingredients which are either in and of themselves incapable of functioning as a binder under any circumstances or which are present in insufficient amounts to effectively act as a binder to agglomerate or tie the particles constituting the mixture together. Our experience indicates that soluble agglutinates such as sugar may be admixed with flour in an amount up to about 3.5% without functioning as the agglutinant for the agglomerates to any appreciable extent. Others of the aforementioned continuations-in-part relate to the solution of problems relating to the agglomeration of flour base mixtures having varying proportions of a functional agglutinant such as sugar admixed therewith.

Therefore, the general object of this invention is to remedy the problems set forth hereinbefore and includes providing novel and commercially successful means and methods for effecting the agglomeration of flour and mixtures thereof into free flowing, substantially dustless, more readily wettable granular agglomerates having sufficient strength to withstand the rigors of subsequent handling, packaging, storing and shipment and a sufficiently stable bulk density to permit measuring thereof without sifting, in a manner and by means to be set forth in more detail hereinafter.

Still another object is to provide a new method of treating flour base products which will lead to the formation of agglomerates having the aforementioned desired attributes.

FIG. 1 illustrates somewhat schematically one form of apparatus which has been successfully employed to carry out the methods of and processes of this invention and effected the agglomeration of the types of flour agglomerate structures desired;

FIG. 2 is a schematic representation of typical unagglomerated flour particles;

FIG. 3 is an elevational representation of a typical agglomerate formed in accordance with our method as viewed under a microscope; and FIG. 4 is a cross-sectional view of a typical agglomerate such as that shown in FIG. 3 and schematically showing the interior of our agglomerates.

In general, the broadly considered method or process of this invention involves moisturizing or wetting the flour particles to glutenize the protein in the flour particles by hydrating said protein and forming moist gluten to an extent sufficient to render the protein in the flour particles in a sticky or tacky adhesive condition to act as an adhesive or binder to bind or tack flour particles together when they are brought into contact with one another. As used throughout this disclosure, the term glutenize or glutenization refers consistently to the hydration of the protein in the flour to form moist tacky adhesive gluten. The moisturized flour particles with the adhesive glutenized protein on the surface are then agitated and caused to come into contact with one another and stick to one another and effect a build up of particles into randomly clustered more readily wettable agglomerates, the particles being firmly held together by the adhesive protein from the flour. The agglomerated structures which are formed are clusters of flour particles which are adhered to one another, with the protein of the flour particles serving as the binder or adhesive to hold the individual flour particles together. When the agglomeration of the flour particles has been completed, the agglomerates are subjected to a drying operation to remove the excess moisture therefrom and to strengthen and rigidify the agglomerates in order to enable them to withstand the rigors of subsequent handling, packaging and transportation, and to drive off sufficient moisture to eliminate the sticky or tacky condition of the material, and keep the flour from molding and spoiling. The entire process is carefully controlled particularly with regards to moisture and temperature to avoid any significant gelatinization of the starch in the flour.

The agglomerates which are formed by the aforementioned general method or process are characterized by the randomly clustered arrangement of the particles, which are strongly adhered to one another in random fashion by the protein therefrom and which are further characterized by the fine interstices or spaces between the unadhered portions of the particles, providing openings or perforations or capillary type passageways extending inwardly from the exterior thereof, thereby providing an irregular rough penetrable exterior and a large exposed surface area which improves the ability of a liquid to more rapidly penetrate and wet the flour particles making up the agglomerates to hasten the formation of the batter or dough in a shorter space of time than is possible with the same flour in unagglomerated form and with less effort and inconvenience, since the agglomerated flour of this invention does not form lumps or masses whose wetted surfaces shield the dry interiors from liquid penetration and wetting thereof, as does the same material in unagglomerated form.

The protein bond forming the adhesive between the agglomerated particles is a relatively strong one and of such nature that the agglomerated flour is quite capable of maintaining its agglomerated form through the rough treatment usually associated with the packaging, shipping and other customary handling of flour.

The agglomerates of this invention are further characterized by being readily uniform in size, virtually dustless and generally granular in nature and capable of being volumetrically measured and used without sifting, and generally uniform in nature throughout.

The method or process set forth in this disclosure and the agglomerated flour structures formed thereby should not be confused with the attempts made in the past to change the physical nature of flour by the simple moisturization of masses of flour (such as disclosed in certain of the prior art) and the resultant products thereof, since neither the methods of the prior art nor the resultant products bear any practical similarity to the methods and products of this invention when subjected to critical examination and analysis. Thus, for example, Anderson in his Patent 1,035,830 gelatinizes flour by adding a large amount of moisture thereto, heats it to a high gelatinizing temperature and then tumbles the gelatinized particles in a rotary drum to cause finer particles to adhere to the gelatinized nuclei or centers in much the same manner as when rolling a snowball in wet snow to make it larger to form a dense mass resembling a lump or ball. This procedure does not tend to form interstices or voids between the component particles to provide a perforate agglomerate structure of increased surface for exposition to a liquid to increase the rate of wettability which is characteristic of the agglomerates of our invention, nor does it result in a product having the usual characteristics of flour insofar as utilization and ultimate end product is concerned, since the starch of Anderson is gelatinized and passed through the stage of paste or dough by being subjected to high temperatures in the presence of large quantities of moisture, which gelatinization does not take place to any significant extent in the methods set forth herein and constituting an important part of this invention, nor is such gelatinization desired since gelatinization prevents the product from being used as ordinary flour might be used, such as in baked products and the like. The product formed by Anderson resembles a dried glue product since the gelatinized starch formed prior to the drying of the lumps formed therefrom is in effect a gluey substance.

Another attempt of the piror art to improve flour by a moisturizing procedure is set forth in the Thomas Patent 1,010,202. Thomas allegedly improves the wheat flour by adding a small minute amount of moisture thereto to attain a uniform moisture content of the product. In effect, the flour of Thomas is simply remoistened to replace a portion of the moisture lost during the milling thereof and no agglomerates are formed. In fact, it would be impossible to build up any agglomerates by the process which Thomas discloses and practices since the amount of moisture which he adds to the flour is poorly distributed and totally inadequate to effect agglomeration of plain flour in the absence of a readily soluble agglutinant of which there is none.

The methods and resultant products of this our invention will also be recognized by those skilled in the art as being completely different from the method and product set forth in the Vernon Patent No. 1,155,977. According to the Vernon theory and procedure, spherical aggregates or masses of flour whose size depends on the size of the water drops can be formed by passing droplets of water into or through a bed or mass of flour particles to allegedly coat the drops of liquid with dusty material to cause the flour particles to be adsorbed on or adsorbed into the surface of the water droplets in much the same manner as sticking particles on the surface of an inflated balloon and then subsequently causing evaporation of the moisture or droplet of water to leave either a hollow shell consisting of particles of flour stuck together forming a hollow shell if the procedure is arrested in time, or a spherical dough ball if permitted to continue for a longer period. This structure is manifestly different from the agglomerated tightly clustered particles of our invention defining passageways or interstices leading thereinto. The manner of operation is also quite different, since it will be readily appreciated by those skilled in the art, that the droplets of water and their size are the controlling factors in the Vernon process, which is basically undesirable since it becomes difficult to control the size of the resultant product. It will be further appreciated by those skilled in the art that because the droplets of water are the controlling factor in the Vernon process, the process is limited to the number of particles which can be adsorbed on the drop surface, such limitations being a function of the drop size and particle size. However, according to the method set forth in this instant disclosure, each particle is supplied with surface moisture and can be made to adhere to other particles or agglomerates at will due to the glutenized adhesive protein thereon, thereby imposing no practical limitations as to the size of the final agglomerates. If a single large void exists in the Vernon aggregate, it provides a structurally weaker aggregate than the randomly clustered agglomerates of our invention. In contradistinction, the agglomerates of our invention are characterized by the large number of multiplicity of very small voids, air spaces or interstices in the agglomerated product, the number of these voids and interstices being of about the same magnitude as the number of individual particles comprising the agglomerates and the size of the voids are very fine or small. The combined effect of the random clustering together of the particles, together with the fine interstices between particles, provides agglomerates of irregular non-symmetrical shape having a large surface area exposed to the wetting action of a liquid in comparison to its size, with perforations extending inwardly from the exterior to aid the penetration of the agglomerates by a liquid, which is an agglomerate different from the spherical masses produced by coating drops of water with dusty flour and forming either a hollow shell-like structure or a solid mass of flour absorbed in each drop of water. In either case, the resultant aggregate has a spherical shape and resembles exteriorly a snowball. Also, as a practical matter, the process taught by Vernon and product resulting therefrom has never become commercially acceptable since it does not form a desirable agglomerate nor does it provide a process which is practically attractive to the industry both from an economical and from an efficiency standpoint. The lumps or spherical masses of Vernon are built up by the absorption of flour into the water drops rather than by random contact as in our agglomerates and do not form as the readily wettable, irregular penetrable type of flour agglomerate of our invention having a proportionately larger surface area to aid in the wetting thereof.

FIGS. 3 and 4 illustrate the type of agglomerate formed by our method and will be discussed in more detail hereinafter.

To teach others how to successfully agglomerate flour into the desired strong more readily wettable perforate structure of our invention, our methods are discussed in more detail hereinafter.

The flour particles must first be wetted or moisturized to effect wetting and glutenization of the protein in the flour particles to an extent sufficient to provide sticky or adhesive protein on the surface of the flour particles which will adhere to other flour particles when brought into contact therewith. Since it is normally undesirable to excessively glutenize the protein in the flour particles to a degree beyond that necessary to effect agglomeration of the flour, the process of moisturizing the flour should be carefully controlled to avoid over-moisturization and excessive glutenization of the protein to avoid producing an inferior product.

At the same time, it should be borne in mind that the protein and starch constituting the flour particles are intimately admixed and the protein is not easily moisturized and glutenized, at least in comparison with the ease of moisturizing and rendering sticky a readily soluble agglutinant such as sugar, and relatively larger quantities or proportions of moisture are needed to glutenize the protein in the flour particles to an extent sufficient to agglomerate the particles, again as compared with the amount of moisture required to place a readily soluble agglutinant such as sugar in an adhesive state.

Thus, our experience has shown that the moisture content of the flour being agglomerated must be raised or increased in the range of 10–30% during the agglomeration operation to effect agglomeration to any significant degree, with the optimum range usually lying between 15% and 25% increase in moisture content. Dispersion of the particles in a vaporous atmosphere of steam and permitting the steam to condense on the particle surfaces is one of the best methods of thoroughly and uniformly wetting particulate material and is one of the preferred courses of action in the other aforementioned co-pending applications involving functional readily soluble agglutinants such as sugars. However, condensation of steam alone on flour particles to effect agglomeration by glutenizing the protein in the flour is generally impractical since it is very difficult if not virtually impossible to add sufficient moisture by way of condensation alone in the ranges hereinbefore indicated as desirable in any practical application, the amount of moisture normally capable of being condensed on particles usually lying in the range of 6% or less due to heating of the flour by both the sensible heat and the latent heat of vaporization of the steam. However, steam condensation can provide an important part of the moisture if utilized in conjunction with liquid water.

Therefore, the most successful method of our invention involves dispersing the flour particles to be agglomerated in a humid atmosphere provided by a finely divided or atomzied spray of liquid water (or liquid water and steam) for a period of time sufficient to glutenize the protein in the flour to the extent desired to cause sticking together of the glutenized particles when they are brought into contact with one another.

To effect as rapid a moisturization and glutenization of the flour as possible, the particles of flour and water are preferably subjected to vigorous agitation and turbulence to disperse the particles in close proximity to one another and to cause a high frequency of contact between the flour and water to provide rapid wetting of the particles, the rate of wetting in this case being directly related to the frequency of contact between the flour and the water and thereby directly related to the degree of agitation.

Once the flour particles have been moisturized to an extent sufficient to provide glutenized adhesive surfaces, they are then brought into contact with one another by maintaining them in dispersed condition while in close proximity and agitating the particles, the particles when making contact with one another adhering to each other because of the adhesive nature of the glutenized protein present on the surface of the particles.

The rate at which the glutenized flour particles are agglomerated is also related to the frequency of contact of the glutenized particles and it is therefore preferable from an efficiency standpoint to vigorously agitate the glutenized particles and cause a high rate of frequency of contact therebetween.

One factor which influences the character of the agglomerated product itself is the force or pressure with which the glutenized particles make contact. If the glutenized particles are thrown together with relatively large impact, the particles of the resulting agglomerates are more tightly grouped and clustered and of a higher density than the agglomerates of the same materal agglomerated with less impact and force of contact. Thus, the bulk density and strength of the agglomerates increases and the degree of porousness decreases as the force of impact or contact increases.

An example of equipment which will successfully agglomerate plain flour or flour mixtures of the type contemplated by this invention is illustrated in FIG. 1 of the accompanying drawings. The apparatus disclosed therein includes a feeding unit which consists of a hopper 10 in which the dry material M to be agglomerated is continuously fed to a screw type conveyor 11 which continuously feeds or delivers the dried powdered material to the mixer, agitator or agglomerator 12 in relatively uniform quanities. In the form illustrated, the dried flour material M is fed to one end of the mixing tube 13 of the agglomerator 12 through a feed opening 13a and gradually travels therethrough and is discharged from the opposite end thereof through discharge opening 13b in an agglomerated state, the discharged agglomerated material being indicated generally by the letter A. To effect the agglomeration of the flour particles in the agglomerator 12, an agitator is housed within the tube 13 and includes a series of paddles or blades 14 which are mounted in staggered spiral fashion on a rotary shaft 15 by means of the radially extending arms 16 with the paddle portions being set at an angle with respect to the shaft so as to in effect operate somewhat as a discontinuous screw conveyor or ribbon mixer to enable the equipment to not only thoroughly and vigorously agitate the dry powdered flour particles in the agglomerator but also to progressively convey the material therein to the discharge end thereof.

As the dry pulverulent flour material M enters the mixer, it is subjected to a moisturizing operation by a spray of water or water and steam injected into the tube 13 adjacent the feed end thereof through a line 17. Thus, the particles of flour are dispersed in the wet atmosphere and thoroughly admixed with the water particles constituting same to enable the flour particles to become sufficiently wetted to effect enough glutenization of the protein in the flour particles to effect and permit the flour particles to adhere to one another and combine into the agglomerates desired through repeated contact with one another. To obtain the denser, stronger more tightly held agglomerates, the mixer illustrated, with a tube 13 six inches in diameter, is operated in a range of 500 to 3600 r.p.m.'s, with 1000 to 2000 r.p.m.'s considered the generally optimum range to provide the degree of agitation between the particles necessary to effect this type of agglomeration and produce the agglomerate structure of FIGS. 2–4. As the material reaches the discharge end of the mixer, the major portion thereof has become combined into the desired agglomerates and is discharged therefrom through a chute 18 onto a vibrating screen 19 carried by the vibratory conveyor 20 shown. Heated air from the duct 21 is continuously passed upwardly through the screen 19 and the bed of agglomerated material to rapidly dry the same and lower the moisture content to a point which eliminates the sticky condition of the agglomerates and strengthens the structure and adherence therebetween to enable them to stand the rigors of subsequent handling and packaging. The hot air is recirculated or exhausted through duct 22. The agglomerated particles are progressively moved along the vibratory conveyor and after passing through the heated drying section pass into a cooling and classifying section at the forward end of the vibratory conveyor where they are subjected to cool dry air. The cooling and classifying section includes a coarser classifying screen 23 to which the dried agglomerates pass from screen 19, the over-sized agglomerates remaining on screen 23, the agglomerated end product falling through the classifying screen 23 onto the finer product supporting screen 24 disposed therebelow, with cooling air entering the cooling section from duct 25, passing upwardly through the material located on both screens 23 and 24 and escaping therefrom through exhaust port 26. Upon reaching the end of the vibratory conveyor, the properly sized product is removed from screen 24 and the overs or over-sized product is taken off from the top screen 23 and reground and recycled to the hopper for reentry into and passage through the agglomerating procedures again.

A typical specific example of flour agglomerated according to the method of our invention by the apparatus illustrated in FIG. 1 is as follows:

Wheat flour was fed into the agglomerator 12 (having a mixing tube six inches in diameter) at a rate of 8 pounds per minute. Water was sprayed into the agglomerator at a rate of 1.76 pounds per minute, with the agitator being rotated at 1080 r.p.m.'s, the agglomerates being dried with hot air having a temperature of 270° F. The agglomerates formed had a bulk density of 0.625 to 0.715 gram/cc., as compared with a bulk density of 0.513 to 0.742 gram/cc., of the same flour in unagglomerated condition, the two bulk density figures in each instance representing the loosely poured bulk density and the more compact bulk density achieved by packing or compacting the material by tapping or otherwise agitating the container of loosely poured material. The starting material had a moisture content of 12%, which was increased to 28%, a gain of 16% during agglomeration, which moisture content was reduced to 10.5% during the drying operation. The agglomerated material blended into a liquid to form a batter much more rapidly than did the same material in unagglomerated form. The agglomerates were also substantially dustless, granular in form, easy to handle, package, pour and measure (without sifting).

It is also well to note at this point that the loose bulk density of the agglomerated flours made according to our method in the apparatus illustrated and under the operational ranges indicated above is always equal to or greater than the loose bulk density of the fine powdered dry unagglomerated materials from which they are formed.

Attention is directed to FIGS. 2 through 4 of the accompanying drawings for a better appreciation and understanding of the agglomerates of our invention. FIGS. 2 and 4 are schematic drawings of the flour particles in unagglomerated and agglomerated state respectively. FIG. 3 is a line drawing of a typical flour agglomerate as viewed under a microscope, with FIG. 4 illustrating how a typical cross-section of an agglomerate such as shown in FIG. 3 appears.

The material shown in FIGS. 2, 3 and 4 is 100% wheat flour which is made up of starch granules S and protein P. FIG. 2 shows the flour in unagglomerated form, and it will be noted that the largest particles are a composite of starch granules S in a matrix of protein P.

FIG. 3 illustrates a typical agglomerate of this invention having a rough irregular exterior. The rough irregular nature of the typical agglomerate illustrated in FIG. 3 formed by the random accumulation and clustering of the individual particles is characterized by raised portions or peaks 30 which are those portions closest to the viewer and are the darkest appearing areas in the drawing, being heavily outlined and stippled. Areas of intermediate depth or elevation 40 are also heavily outlined, with stippling being provided around the entire periphery of these intermediate areas just inside the heavy outline to better emphasize the outline thereof. Those areas furtherest away from the viewer are indicated at 50. It will be appreciated from a consideration of FIG. 3 that the agglomerates of this invention present a large exposed surface area to the action of a liquid for rapid penetration by the liquid and rapid dispersion of the flour therein, which action is enhanced by the voids between particles, which are best appreciated from a consideration of FIG. 4.

FIG. 4 is a cross-sectional view of a typical agglomerate such as that of FIG. 3 and quite clearly illustrates how the individual flour particles such as those shown in FIG. 2 are randomly brought together to form the readily wettable penetrable agglomerate of this invention. FIG. 4 clearly shows the flour particles with their starch granules S and protein P randomly grouped and held by the adhesive glutenized protein and defining the voids V, which voids increase the surface area exposed to the wetting action of a liquid when mixed therewith and enable the liquid to complete the wetting and dispersing of the particles comprising the agglomerate more rapidly than would be the case if the voids were not present. FIG. 4 also makes it easier to appreciate why the randomly clustered penetrable arrangement of the particles comprising the agglomerates and the granular nature of the agglomerates prevent the build up and formation of lumps, cake or balls when mixed with a liquid which are difficult for the liquid to penetrate and thoroughly wet, such as is the case with fine, powdery unagglomerated flours.

The degree or extent of agglomeration (that is, the number of individual particles in the average agglomerate) is a function of the particle concentration in the agglomerating chamber, the degree of turbulence or particle activity, and the duration of the mixing or agglomerating time.

From the foregoing, the advantages of our invention should be readily apparent. We have, for the first time, provided an easily wettable, strong penetrable virtually dustless agglomerated flour, the particles of which are held together by the flours' own protein in a glutenized state, which agglomerates are also capable of withstanding the strain of packaging, handling and shipping without disintegrating, and which may be volumetrically measured during use without sifting, due to their granular free flowing nature. In addition, we have provided a novel and unique method of accomplishing this agglomeration, which method is practical, efficient and economical and readily adapted to large scale commercial application.

It will, of course, be understood that various changes may be made in the form, details, arrangement and proportions of the various parts without departing from the scope of our invention.

What is claimed is:

A method of agglomerating dry powdery flour base material containing less than 3.5% functional soluble agglutinant into free flowing, dustless, readily wettable agglomerates comprising feeding the material to be agglomerated into one end of an elongate mixing chamber, providing a humid atmosphere in said chamber for wetting and forming adhesive gluten on the flour particles and increasing the moisture content of the material within the range of 10-30%, and dispersing and agitating said material in said chamber and moving it continuously therethrough to the other end thereof by means of a bladed mixer constituting a discontinuous ribbon mixer and rapidly rotating at a rate of 500-3600 revolutions per minute whereby the dispersed wetted particles are thrown together in random fashion to form agglomerates which are discharged from said other end of said chamber and have a loose bulk density not less than the loose bulk density of the starting material, and drying said agglomerates.

References Cited by the Examiner
UNITED STATES PATENTS

| | | | |
|---|---|---|---|
| 1,035,830 | 8/1912 | Anderson | 99—93 |
| 1,155,977 | 10/1915 | Vernon | 99—93 |
| 2,832,686 | 4/1958 | Louder et al. | 99—56 |
| 2,835,586 | 5/1958 | Peebles | 99—56 |
| 2,841,497 | 7/1958 | Carcassonne-Leduc | 99—94 |
| 2,856,290 | 10/1958 | Peebles | 99—83 |
| 2,893,871 | 7/1959 | Griffin | 99—56 |

A. LOUIS MONACELL, *Primary Examiner.*

TOBIAS E. LEVOW, ABRAHAM H. WINKELSTEIN,
*Examiners.*